(12) United States Patent
Kaczenski et al.

(10) Patent No.: US 7,497,682 B2
(45) Date of Patent: Mar. 3, 2009

(54) METHOD OF OPERATING FURNACE TO REDUCE EMISSIONS

(75) Inventors: Edward Kaczenski, Greenfield, MA (US); Lawrence E. Bool, III, East Aurora, NY (US); Hisashi Kobayashi, Putnam Valley, NY (US)

(73) Assignee: Praxair Technology, Inc., Danbury, CT (US)

( * ) Notice: Subject to any disclaimer, the term of this patent is extended or adjusted under 35 U.S.C. 154(b) by 309 days.

(21) Appl. No.: 11/296,367

(22) Filed: Dec. 8, 2005

(65) Prior Publication Data
US 2006/0230996 A1    Oct. 19, 2006

Related U.S. Application Data (60) Provisional application No. 60/644,889, filed on Jan. 18, 2005.

(51) Int. Cl.
*F23M 3/04* (2006.01)
*F23J 15/00* (2006.01)

(52) U.S. Cl. .............................. 431/8; 431/10; 431/187; 110/345; 110/348

(58) Field of Classification Search .................. 110/347, 110/343, 344, 345, 261, 348; 431/8, 10
See application file for complete search history.

(56) References Cited

U.S. PATENT DOCUMENTS

| 4,403,941 | A | 9/1983 | Okiura et al. |
| 5,387,100 | A | 2/1995 | Kobayashi |
| 6,685,893 | B2 * | 2/2004 | Platvoet et al. .............. 422/198 |
| 6,699,030 | B2 | 3/2004 | Bool, III et al. |
| 6,799,526 | B2 * | 10/2004 | Philippe et al. ............. 110/345 |
| 2002/0127505 | A1 | 9/2002 | Kobayashi et al. |
| 2003/0009932 | A1 | 1/2003 | Kobayashi et al. |

OTHER PUBLICATIONS

Bowman, Craig T. Control of Comustion-Generated Nitrogen Oxide Emissions: Technology Driven by Regulation. Twenty-Fourth Symposium Int'l on Combusion/The Combustion Institute. (1992) pp. 859-878.

Eddings, Eric G. et al. "Advances in the Use of Computer Simulations for Evaluating Combustion Alternatives". Paper to be presented at 3$^{rd}$ Crest Int'l Symp. On High Temperature Air Compustion and Gasification, Japan (Mar. 6-9, 2000).

Johnson, S. A. et al. "Interpretation of Small and Intermediate Scale Test Results From a Low Nox Combustion System for Pulverized Coal". Technical Paper for Int'l Flame Research Foundation Advanced Compustion Technology Meeting, Holland (May 12-14, 1980).

* cited by examiner

*Primary Examiner*—Steven B McAllister
*Assistant Examiner*—Nikhil Mashruwala
(74) *Attorney, Agent, or Firm*—Donald T. Black (57) ABSTRACT

Emissions of NOx and CO are reduced from combustion devices such as coal-fired furnaces by increasing the stoichiometric ratio of burner(s) having a lower average temperature and increasing the stoichiometric ratio of burner(s) having a higher average temperature.

19 Claims, 5 Drawing Sheets

FIG. 1

Staging Curve For Coal Combustion With Low NOx Burners

Effect Of Cooling Rate On NOx Formation From Coal Volatiles

METHOD OF OPERATING FURNACE TO REDUCE EMISSIONS

This application claims priority from prior copending U.S. provisional application Ser. No. 60/644,889, filed Jan. 18, 2005.

FIELD OF THE INVENTION

The present invention relates to combustion in, for instance, a coal-fueled boiler for generating electric power.

BACKGROUND OF THE INVENTION

Nitrogen oxides, typically called "NOx", have been implicated in the formation of ground level ozone and acid rain. Combustion of pulverized coal, or other nitrogen bearing hydrocarbonaceous fuels, in boilers represents a significant source of NOx emissions. Current and pending regulations require that NOx emissions from these facilities be reduced significantly from present values.

One technology that is currently used to reduce NOx emissions is air staging in the furnace. In this technology the airflow to the burners, which may be low NOx burners, is typically less than that required to completely combust the fuel. This arrangement creates a fuel-rich zone that tends to drive the nitrogen from the fuel to react to form molecular nitrogen instead of NOx. The remainder of the combustion air is introduced through air ports above the burner zone. The air introduced in this manner is termed "overfire air" herein and in this field. Although effective, this arrangement can be problematic for some boilers.

For example, boilers in which the residence time between the top row of burners and the overfire air is short and/or the residence time between the overfire air ports and the furnace exit plane is short. Under these conditions there is not enough residence time available to completely combust the CO formed in the fuel rich stage. When coupled with a high heat release rate, defined as the heat release per unit furnace volume in the burner zone, this can also lead to significant amounts of combustion taking place in the upper furnace. This combustion in the upper furnace, in turn, can cause problems with the steam temperature control and can cause additional NOx formation—in some cases actually negating any benefit of staging in the burner zone.

Figure 1:
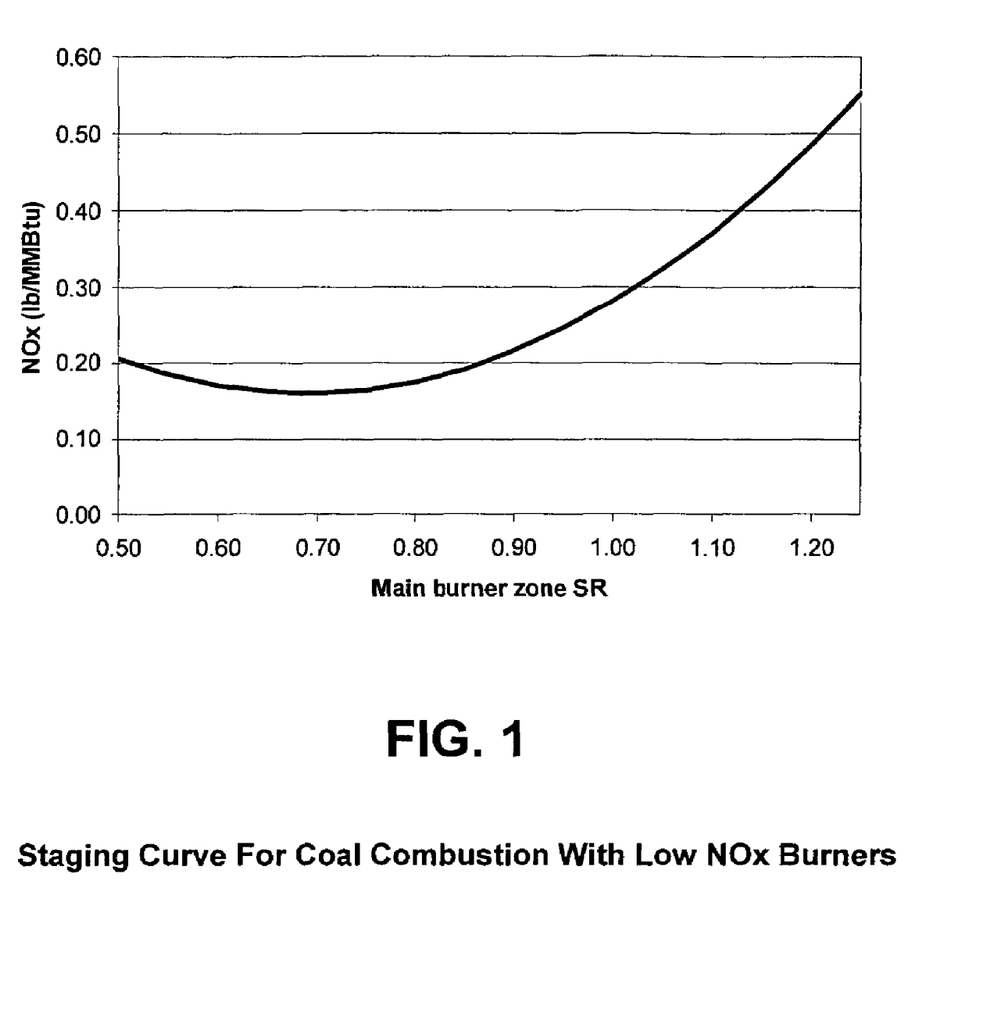
FIG. 1 is a graph of NOx emission plotted against the stoichiometric ratio of a conventional combustion device.

The use of air-staging for NOx control is well known and is based on a competition between reactions that convert fuel nitrogen to $N_2$ and oxidation of fuel nitrogen to NO. The net result of these competing reactions can be shown in FIG. 1, which represents a typical staging curve. When the burner is operated under fuel lean conditions the flame temperature is high and extra oxygen is available. Under these conditions the oxidation reactions dominate which leads to increased NOx formation, particularly when coupled to the increase in thermal NOx formation under these conditions. Under very fuel rich conditions the flame temperatures are reduced since less heat is released. Consequently when fuel nitrogen is released from the coal there is very little conversion of these species to either $N_2$ or NOx in the fuel rich zone. When the overfire air is added the fuel nitrogen species are oxidized to NO.

Many investigators, such as Bowman, C., "Control of Combustion-Generated Nitrogen Oxide Emissions: Technology Driven by Regulation", *Twenty-Fourth Symposium (International) on Combustion*, The Combustion Institute, 1992, and Johnson, S., Yang, R., Sommer, T., "Interpretation of Small and Intermediate Scale Test Results from a Low NOx Combustion System for Pulverized Coal", *International Flame Research Foundation Meeting*, Noordwijkerhout, Holland, May 1980, suggest that the optimal stoichiometric ratio for NOx emissions is in the range of approximately 0.65-0.80. In general careful attention is paid to achieve overall stoichiometric ratios near this optimum. Based on this staging curve the concept of operating some burners extremely fuel rich and others extremely fuel lean would seem to yield the worst possible conditions for NOx control—not the observed reductions in NOx formation from this invention.

In conjunction with the concept of tuning the burner stoichiometric ratio to a specific value U.S. Pat. No. 6,699,030 teaches that oxygen injection can be used to minimize variations in stoichiometric ratio from burner to burner. In one example this patent teaches to increase the flame temperature of those burners operating at the bottom of the boiler or near the walls. In contrast, the present invention described herein takes advantage of the naturally occurring lower flame temperatures found in these regions coupled with dramatically different burner stoichiometric ratios to achieve low NOx.

Other investigators have disclosed methods of reducing NOx emissions by increasing the temperature in the fuel rich zone. For example, Eddings, E., Sarofim, A., Adams, B., Harding, S., Heap, M., "Advances in the Use of Computer Simulations for Evaluating Combustion Alternatives", *The 3rd CREST International Symposium on High Temperature Air Combustion and Gasification*, Yokohama, Japan, Mar. 6-9, 2000, discusses the potential impact of high air preheat temperatures on NOx emissions under fuel rich conditions. However, although increasing the air preheat temperature would lead to lower emissions under fuel rich conditions it could actually exacerbate some of the problems discussed above with staging in constrained units, particularly steam temperature problems. High air preheat temperatures would also increase the NOx formation under lean conditions unlike the current invention. Kobayashi, H., Bool, L. E., "Oxygen Enhanced Low NOx Combustion", U.S. Patent Application No. 20030009932, published Jan. 16, 2003 and Kobayashi, H., Bool, L. E., , "Oxygen Enhanced Low NOx Combustion", U.S. Patent Application No. 20020127505, published Sep. 19, 2002, disclose methods of increasing the local flame temperatures by replacing a portion of the combustion air with oxygen. Again, conventional wisdom would suggest that adding oxygen under lean conditions would cause an increase in the net NOx emissions. However the current invention was shown to actually reduce NOx emissions when oxygen was added to the fuel lean burners.

The concept of staggered burner stoichiometric ratios for NOx control is discussed by U.S. Pat. No. 5,387,100, This patent discloses a method of alternating fuel rich and fuel lean burners such that the exhaust gases of both mix downstream in the furnace to complete combustion. By using both very fuel rich and very fuel lean burners the goal is to minimize the flame temperature in all the burners, and therefore minimize the thermal NOx formation. In the present invention the goal is to achieve high flame temperatures in the fuel rich burners—the opposite of that taught in this patent.

BRIEF SUMMARY OF THE INVENTION

In one aspect the present invention is a method for combusting hydrocarbonaceous fuel containing bound nitrogen in a furnace comprising (A) providing a furnace which comprises a plurality of burners, means for supplying combustion air to each of said plurality of burners including a common source for the combustion air fed to said plurality of burners, overfire air means for supplying overfire air into said furnace, and means for supplying hydrocarbonaceous fuel containing bound nitrogen to each of said plurality of burners, (B) feeding said fuel and combustion air to said burners, feeding air through said overfire means into said furnace, and combusting said fuel and combustion air in said burners to generate from each burner a flame within said furnace, wherein a first group of two or more contiguous burners produce a first group of flames and a second group of contiguous burners produce a second group of flames whose average temperature is higher than the average temperature of the first group of flames, and wherein said combustion produces flue gas containing NOx and CO, and (C) decreasing the NOx content and the CO content of said flue gas by increasing the stoichiometric ratio of said first group of burners and decreasing the stoichiometric ratio of said second group of burners, wherein the total amount of oxygen fed into said furnace is at least 100% of the amount needed to completely combust the total amount of fuel fed into said furnace.

In another aspect the present invention is a method for combusting hydrocarbonaceous fuel containing bound nitrogen in a furnace comprising providing a furnace which comprises a plurality of burners including first and second groups of burners wherein the burners in said first group are closer to a side wall or to the bottom of said furnace than the burners in said second group, means for supplying combustion air to each of said plurality of burners including a common source for the combustion air fed to said plurality of burners, means for supplying hydrocarbonaceous fuel containing bound nitrogen to each of said plurality of burners and means for supplying overfire air to said furnace, feeding said fuel and combustion air to said burners and combusting said fuel and combustion air in said burners, wherein the stoichiometric ratio of said first group of burners is 0.9 to 1.5 and the stoichiometric ratio of said second group of burners is 0.2 to 0.7, and wherein the total amount of oxygen fed into said furnace is at least 100% of the amount needed to completely combust the total amount of fuel fed into said furnace.

As used herein, "stoichiometric ratio" means the ratio of oxygen fed, to the total amount of oxygen that would be necessary to convert fully all carbon, sulfur and hydrogen present in the substances comprising the feed to carbon dioxide, sulfur dioxide, and water.

As used herein, "NOx" means oxides of nitrogen such as but not limited to NO, $NO_2$, $NO_3$, $N_2O$, $N_2O_3$, $N_2O_4$, $N_3O_4$, and mixtures thereof.

Figure 2:
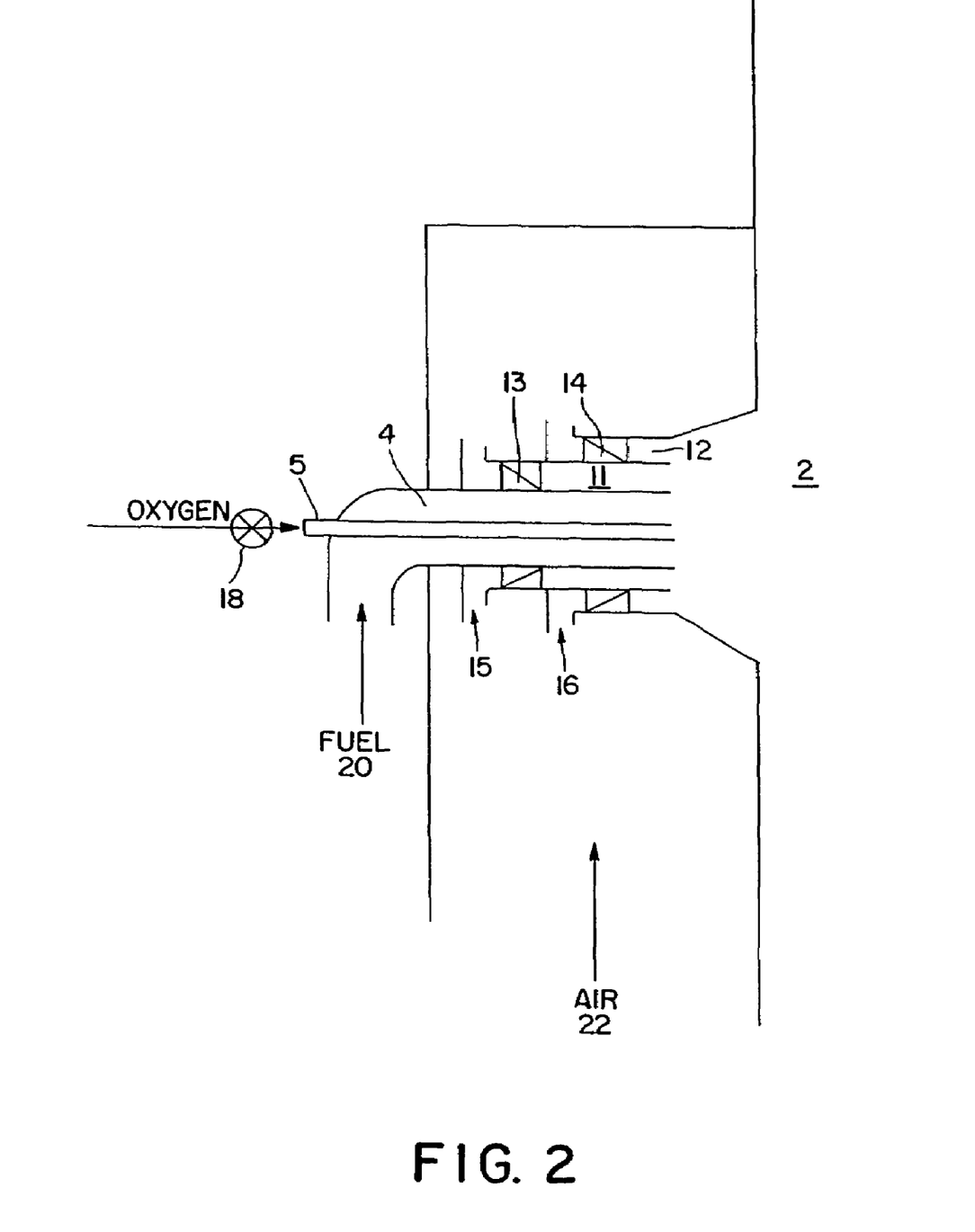
FIG. 2 is a cross-sectional view of a burner useful in the practice of the present invention.

As used herein, "furnace" means a device which, together with the burners and the means for feeding fuel and air as described herein, comprises a combustion chamber wherein said fuel combusts with said air to generate heat of combustion and gaseous combustion products, flue means for enabling said combustion products to leave the combustion chamber, and heating means for using said heat of combustion to produce steam, As used herein, "burner" means a means for feeding fuel and oxidant into a furnace either already commingled or such that the fuel and an associated stream of oxidant commingle within the furnace, whereby the fuel and oxidant combust. Examples of burners include burners as depicted in FIG. 2, wherein a fuel stream and an oxidant stream are fed such that one stream surrounds the other as they enter the furnace.

As used herein, "staged combustion" means combustion in a furnace wherein a portion of the combustion air (the "overfire air") required for complete combustion of the fuel is fed to the furnace not through or immediately adjacent any burner but instead through one or more inlets situated between the burner(s) and the furnace flue means, and is fed without an associated feed of fuel.

DETAILED DESCRIPTION OF THE INVENTION

Figure 3A:
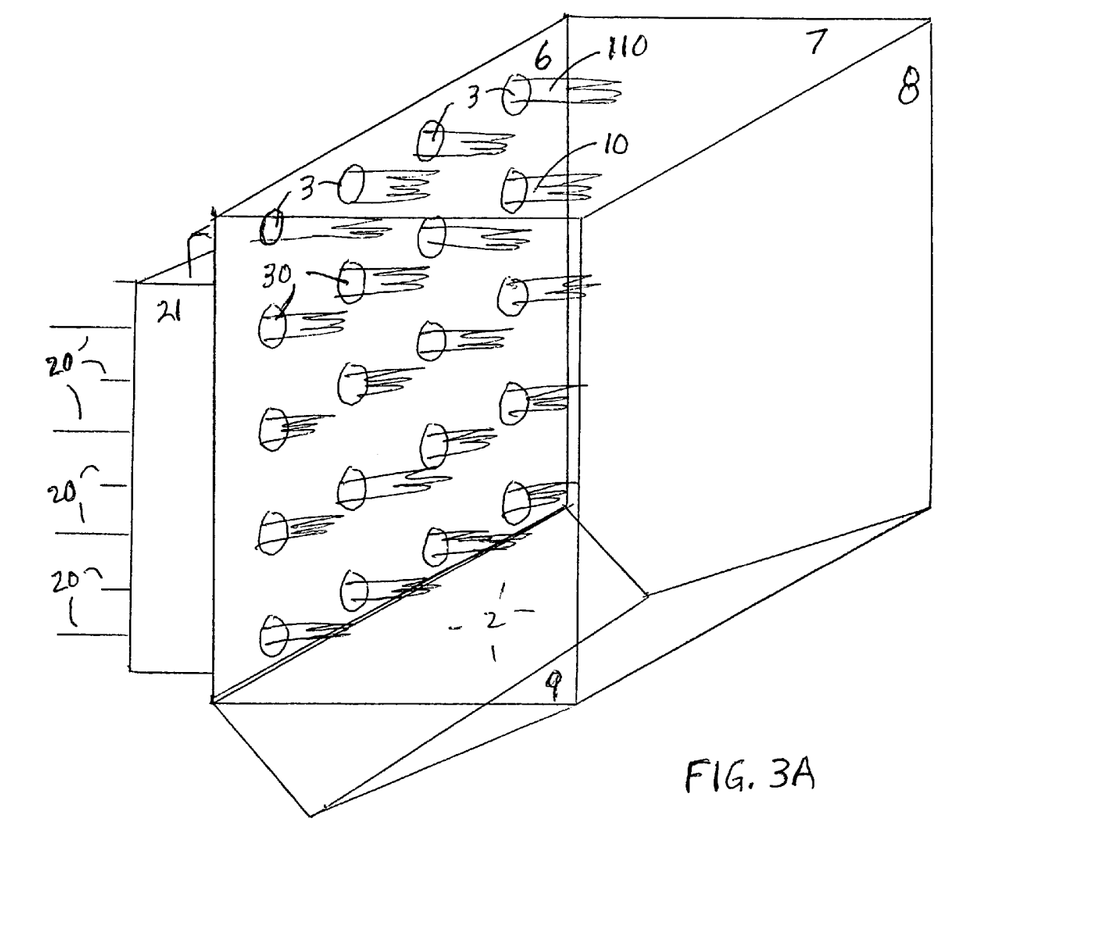
FIG. 3A is a perspective view of one embodiment of a combustion device with which the present invention can be practiced.

FIG. 3A shows combustion device 1, which can be any apparatus wherein combustion is carried out in the interior 2 of the device. Preferred combustion devices include furnaces and boilers which are used to generate steam by conventional means, not shown.

The furnace in FIG. 3A is depicted with four rows of burners 30 arranged in four burners per row. For reference purposes, these burners are identified as shown in FIG. 3B by a letter and a number, with the letter identifying the row (A being the row highest in elevation and D being the row lowest in elevation) and the number identifying the columnar position in left-to-right ascending sequence.

Figure 3B:
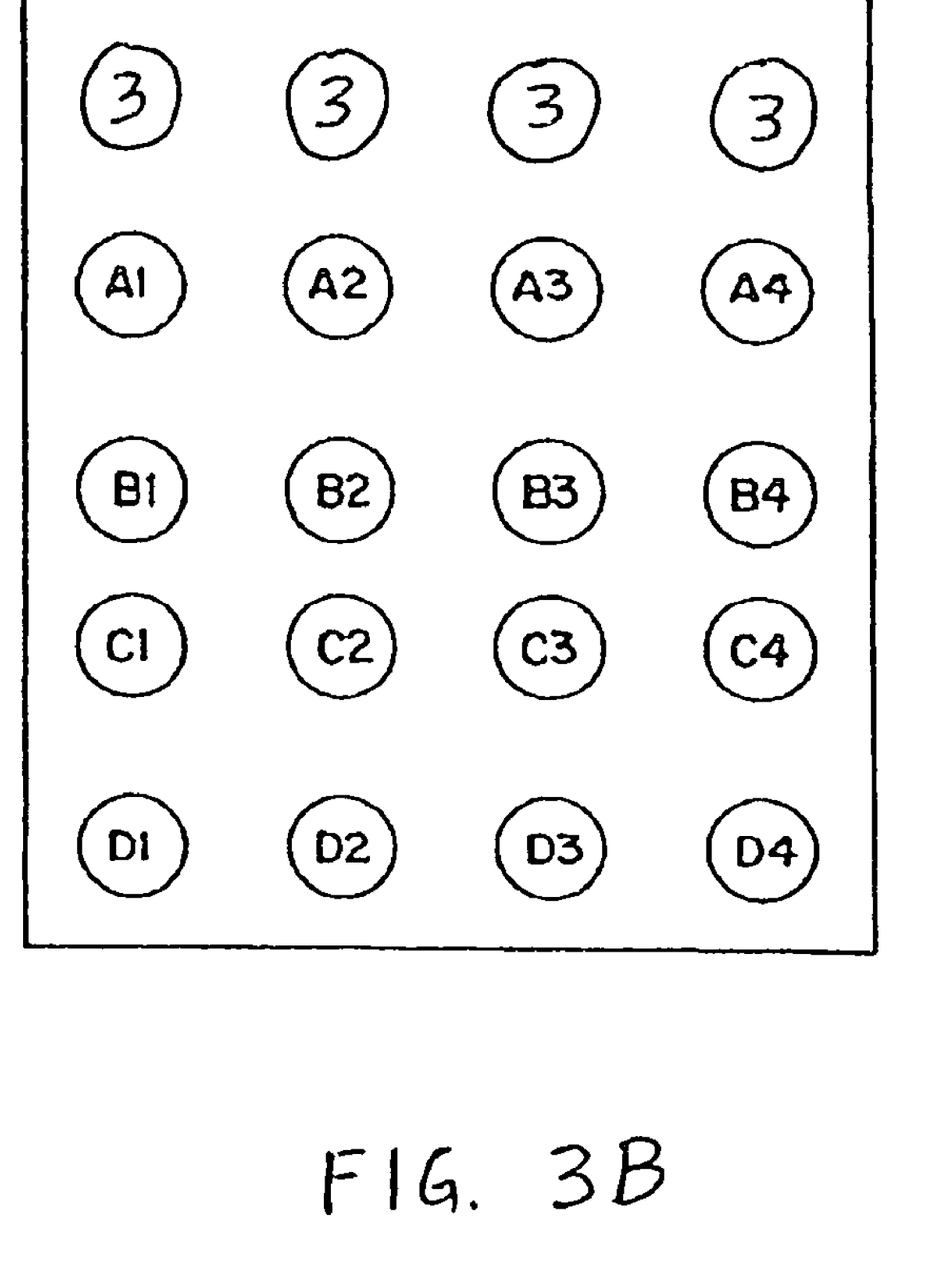
FIG. 3B is a front view facing the burners of FIG. 3A.

The invention can be practiced as well with furnaces containing more or fewer than the 16 burners depicted in FIGS. 3A and 3B, and with more or fewer rows and more or fewer columns of burners. Also, the burners can be arrayed in a staggered or offset fashion so that the burners in adjacent rows lie on a diagonal line instead of along a vertical line as shown in FIGS. 3A and 3B. Further, burners can be arrayed in one front wall 6, as shown in FIG. 3A, or they can be arrayed in front wall 6 and also in back wall 8, in which case the burners in back wall 8 would also be equipped with the windbox 21 and feed lines for air and fuel (and optionally oxygen) as described herein for the burners in front wall 6.

The combustion device 1 also has side walls 7 and 9, it being recognized that the view provided in FIG. 3A is through side wall 9.

Fuel and air (and, optionally, oxygen as described below) from sources thereof outside the combustion device 1 are fed to the burners and combust in the interior 2 of combustion device 1. Suitable fuels include natural gas, hydrocarbon liquids, such as fuel oil, and also include pulverulent hydrocarbon solids, a preferred example of which is pulverized coal or petroleum coke. FIG. 3A shows some of the lines 20 through which fuel is fed to the burners. The fuel, air and optional additional oxygen are fed as shown in FIG. 2.

As seen more closely in FIG. 2, each burner that is employed in the device of FIG. 3A is preferably comprised of several concentrically arranged passages, although other constructions to the same effect can be used. The fuel is fed through line 20 from a source thereof through annular passage 4. In the optional preferred embodiment of this invention, an axial lance 5 around which annular passage 4 is disposed concentrically is provided, through which oxygen can be fed as described herein. The flow of oxygen can be controlled or shut off via valve 18.

Preferably, the fuel is transported from a supply source to one or more burners and is propelled through the burner into the interior 2 of combustion device 1, by suitable pump means in the case of liquids such as fuel oil, and by blowers and impellers of conventional design in the case of hydrocarbon solids such as pulverized coal, which are conventionally fed into the combustion device with the aid of transport air or primary air. Liquid hydrocarbon fuels are preferably fed through one or more atomizing nozzles of conventional design, to feed the liquid fuel into the combustion chamber as discrete, dispersed droplets with atomizing air. An effective amount typically about 1.5 to 2.0 lb of primary air is used to transport 1 lb of coal, which corresponds to about 20% of the stoichiometric combustion air required for complete combustion of bituminous coal. For combustion of heavy oil about 0.5 to 1.0 lb of primary air is typically used to atomize 1 lb of oil.

Combustion air 22 is supplied by a forced draft (FD) fan to one or more windboxes 21 and fed to air passages of the burners. Secondary combustion air 15 is fed through the burner, preferably through concentrically arranged annular passages 11 surrounding the annular space 4 through which the hydrocarbon fuel is fed. Preferably tertiary combustion air 16 is fed through the burner, preferably through concentrically arranged annular passages 12 surrounding the secondary air passage. Preferably, the secondary and tertiary combustion air are fed at the burner so as to swirl about a longitudinal axis, thereby creating a recirculation zone near each burner and improving the stability of the flame and commingling of air and fuel. Swirl can be achieved by known techniques, such as providing deflectors, 13 and 14, in the annular passages for secondary and tertiary air flow of the burner which direct the flow of the streams in the desired swirling direction. It is preferred to provide a high degree of swirl, preferably a swirl number, as defined in "Combustion Aerodynamics", J. M. Beer and N. A. Chigier, Robert E. Krieger Publishing Company, Inc., 1983, of 0.6 to 2.0.

Combustion air is fed into the interior 2 through overfire air ports 3 (seen in FIG. 3A).

The fuel and combustion air combust at each burner to form flames 10. Additional combustion occurs as flames 110 extending into the furnace from the overfire air ports 3. The combustion produces heat, which can be absorbed at side walls 7 and 9 (and back wall 8 if it does not contain burners) into heat-absorbing features in the walls such as tubes containing water or other material that the operator desires to heat. The combustion produces gaseous combustion products, typically including carbon dioxide, carbon monoxide (CO), and NOx. The gaseous combustion products flow upwards, often through structure that can absorb additional heat therefrom such as superheaters and reheaters. The gaseous combustion products leave the furnace as flue gas that still contains amounts of CO and NOx.

The practice of the present invention to reduce NOx and CO emissions uses a variable stoichiometric ratio firing strategy. The stoichiometric ratio of burners in relatively cooler-burning regions of the furnace is increased so that they operate more fuel lean, and the stoichiometric ratio of burners in relatively hotter-burning regions of the furnace is decreased so that they operate more fuel rich. For example, the bottom-most row of burners (i.e. burners D1, D2, D3 and D4 in FIG. 3B) would be fired more fuel lean such that more or even most of the heat generation in the furnace takes place in the lower area of the furnace. The relatively low flame temperatures (and the associated relatively low heat release rate) typical of this area of the furnace (before the stoichiometric rate is adjusted) would mitigate some of the NOx emissions associated with running the burners fuel lean. At the same time one or more of the upper rows of burners (i.e. burners A1, A2, A3 and A4, and optionally also burners B1, B2, B3 and B4) would be fired to be more fuel rich.

This condition also increases the furnace heat release in the lower furnace thus lowering the heat release in the upper furnace. For relatively small furnaces with high overall heat releases and an OFA system, this condition tends to mitigate excessive superheat temperatures associated with higher furnace heat release rates in the upper furnace.

The operation of the bottom-most row of burners under fuel lean conditions increases the excess oxygen in the flue gas and provides a beneficial effect of keeping the boiler tube wall surfaces more oxidizing near the back wall 8, i.e., the wall opposite from the burner wall, which is a condition known to reduce corrosion of boiler tubes.

Following these adjustments of the stoichiometric ratio, a significant portion of the heat is released in the bottom row of burners. Some of the heat is transferred to the flames from the upper rows of burners by radiation. This radiative heat transfer serves to heat the flames from the upper row(s) of burners more than if those burners were fired alone surrounded by colder walls such as in a boiler furnace. Thus the upper rows of burners would be firing extremely fuel rich and hot—conditions which are known to lead to very low NOx formations. In fact, under some conditions the very low NOx formation in the upper row(s) of burners more than offsets the increased NOx formation in the bottom rows—so that the overall NOx emissions are lower than if all the burners were fired at the average stoichiometric ratio of the overall furnace.

The stoichiometric ratio can be increased or decreased in any of several ways. The preferred way is to increase or decrease, respectively, the flow rate of combustion air to the burner. This can conveniently be done by adjusting a valve or vane in the combustion air passageway so that it is larger or smaller and thereby alters the amount of air flowing to the associated burner. The stoichiometric ratio can also be increased or decreased by decreasing or increasing, respectively, the flow rate of fuel to the burner. This can be accomplished by appropriate adjustment of the rate at the pump or impeller that is providing the fuel.

In an operating furnace, the burners that are considered to operate at relatively lower average flame temperatures include those on the bottom row, and those that are in columns closest to side walls, because they have neighboring burners in only two or three directions, and because the adjacent walls absorb some of the heat they generate. Burners in the middle of the bottom row might run a little hotter than those on the ends of that row, since there are adjacent flames above and to both sides. In contrast, the burners in the top row of a boiler are typically the hottest-burning due to radiant heat transfer from all the flames below and the overfire air flames above. Heat transfer to the upper rows of burners is also augmented by convection. Furnaces with this sort of distribution of hotter and cooler burners are especially benefited by the present invention.

The stoichiometric ratio of what had been the cooler-burning burners is preferably adjusted to a value in the range 0.9 to 1.5, and more preferably to a value in the range 1.0 to 1.2. The stoichiometric ratio of what had been the hotter-burning burners is preferably adjusted to a value in the range 0.2 to 0.7, and more preferably to a value in the range 0.45 to 0.55.

In a preferred embodiment of the invention, a gaseous oxidant stream is fed through lance 5 into the flame 10. The oxidant stream has an oxygen content greater than that of air, i.e. at least 22 vol. %, and preferably at least 25 vol. %, and more preferably at least 80 or 90 vol. %. The flow rate of the combustion air to the burner is reduced, and an amount of the oxidant stream (taking into account its oxygen content) is fed which corresponds to replacement of at least 5%, at least 10%, at least 15%, up to 40%, of the oxygen in the combustion air with the oxygen in the oxidant stream. The oxidant stream is fed in this manner to all burners or to only a selected number of the burners so as to provide to the selected burners flame stability and the other advantages described herein that the oxygen injection provides.

Figure 4:
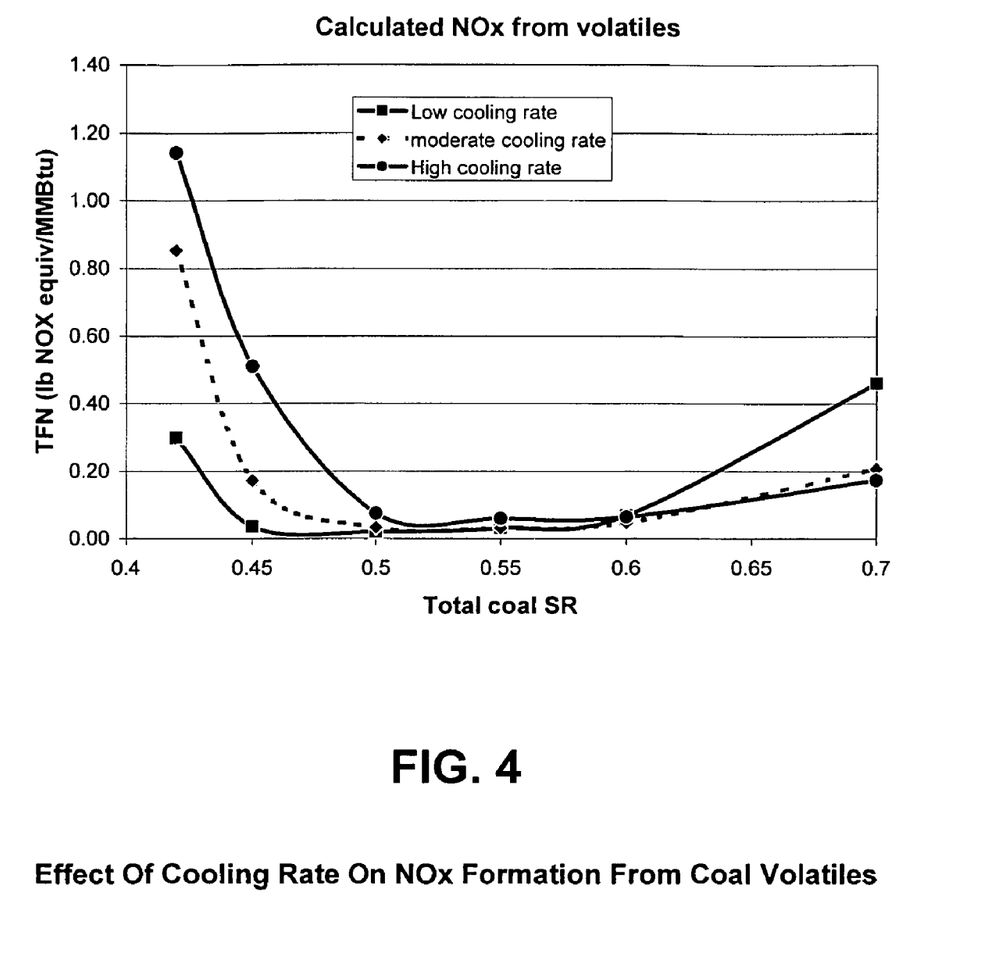
FIG. 4 is a graph of total fixed nitrogen plotted against stoichiometric ratio for a furnace.

When a burner is operated under very fuel rich conditions with the cooling rates typical of commercial operations, the total fixed nitrogen (TFN) in the flue gas, including NOx and NOx precursors such as HCN and NH3, can be substantial. However, when that same burner is operated with lower net cooling rates, as would be typical of the upper row(s) of burners, the reactions driving the conversion of fuel nitrogen to $N_2$ are actually increased and thereby reducing TFN. This effect is shown by kinetic calculations where coal volatiles, which contain approximately 50% of the nitrogen in the coal, are assumed to burn under specific conditions and specific cooling rates. FIG. 4 shows how the TFN is predicted to change with different burner stoichiometric ratios and cooling rates. Under very fuel rich conditions (i.e. stoichiometric ratio<0.45) and high cooling rates the TFN can be higher than if the burner was operated fuel lean. However, as the cooling rate decreases the resulting TFN decreases dramatically. Therefore by operating those burners that have the lowest cooling rate, such as the top row, very fuel rich it can be possible to dramatically reduce the TFN. This effect can be improved still further if the burner is operated on air at a stoichiometric ratio below the optimum and oxygen is added to the flame through lance 5 such that the burner zone stoichiometric ratio approaches a more advantageous value. For example, if the burner is operated at a stoichiometric ratio of 0.40 on air alone then according to FIG. 4 adding 5% of the stoichiometric oxygen requirement in the form of oxygen would move the burner stoichiometric ratio to 0.45, which provides a substantial reduction in TFN. By injecting oxygen through lance 5 into the fuel rich burners it is possible to achieve higher flame temperature, which enhances NOx reduction yet further, for the optimal burner stoichiometric ratio. The oxygen further serves to help maintain flame stability in these very fuel rich burners.

In contrast, burners operated fuel lean and relatively cooler-burning form less NOx, due to lower thermal NOx formation and possibly lower fuel nitrogen oxidation. Therefore operating the furnace such that the cooler-burning burners (i.e. the bottom row of burners) are operated fuel lean and the hotter-burning burners (i.e. the top row of burners) are operated very fuel rich minimizes NOx emissions. Oxygen can be added to the lean rows through lance 5 to enhance flame stability.

The burners between the hottest-burning and coolest-burning burners, such as burners between the lowest and highest rows of burners, can be operated increasingly fuel rich from bottom to top, to take further advantage of the heating of the flames from the upper burners by the flames from the lower burners.

The limited mixing that occurs between flames at the burners in the fuel rich upper rows can serve to destroy NOx formed in the lower rows of burners via a reburning mechanism. Selected use of oxygen injection can enhance this firing strategy by enhancing staging and flame stability in the fuel rich row(s) and enhancing flame stability in the more fuel lean row(s). Since the temperature in the upper furnace is kept relatively constant (relative to the unstaged condition) by the increased heat release in the lower furnace the previously mentioned steam temperature problems are avoided. Further, the lower upper furnace temperatures minimize NOx formation in the second stage and therefore increase the staging effectiveness compared to conventional burner firing configurations. Thus by careful control of the burner stoichiometric ratios it can be possible to achieve significant NOx reduction without the problems associated with heat release and combustion in the upper furnace.

The invention provides numerous advantages.

The primary advantage of the present invention is that it represents an alternate, readily implemented, firing strategy to achieve reduced NOx emissions. This invention has particular application in those units where conventional staging is constrained by high heat release rates and short residence times of the combustion products in the stage of the furnace between the overfire air jets and heat-absorbing apparatus above the overfire air ports. Operating burners in the lower part of the furnace fuel lean, in accordance with the invention, ensures that a substantial portion of the heat release takes place low in the furnace and the atmosphere near the back wall 8 becomes more oxidizing—avoiding potential superheat steam temperature problems and potential boiler tube corrosion problems. Further, since the burners in the lower part of the furnace tend to operate cooler, the impact of fuel lean operation on NOx is reduced (i.e. NOx emissions are lower than if burners in the upper region were operated fuel lean). Adding oxygen to the lower, fuel lean, burners can also reduce NOx by improving flame stability and better anchoring the flame—both of which reduce NOx emissions. Since the flames are shorter with oxygen addition, CO and waterwall wastage issues related to flame impingement of the bottom row of burners (with or without staging) are also minimized. At the same time NOx emissions from the top rows of burners, i.e. the hotter-burning burners, are reduced to very low levels, particularly with oxygen addition through lance 5 as described herein. The net effect is that overall NOx emissions can often be lower than would be achieved if the entire furnace was staged to the same average stoichiometric ratio. With this invention the reduced NOx emissions can be accomplished without significant detrimental impacts, such as steam temperature excursions or CO emission excursions.

What is claimed is:

1. A method for corn busting hydrocarbonaceous fuel containing bound nitrogen in a furnace comprising
   (A) providing a furnace which comprises a plurality of burners, means for supplying combustion air to each of said plurality of burners including a common source for the combustion air fed to said plurality of burners, overfire air means for supplying overfire air into said furnace, and means for supplying hydrocarbonaceous fuel containing bound nitrogen to each of said plurality of burners,
   (B) feeding said fuel and combustion air to said burners, feeding air through said overfire means into said furnace, and combusting said fuel and combustion air in said burners to generate from each burner a flame within said furnace, wherein a first group of two or more contiguous burners produce a first group of flames and a second group of contiguous burners produce a second group of flames whose average temperature is higher than the average temperature of the first group of flames, and wherein said combustion produces flue gas containing NOx and CO, and
   (C) decreasing the NOx content and the CO content of said flue gas by increasing the stoichiometric ratio of said first group of burners and decreasing the stoichiometric ratio of said second group of burners, wherein the total amount of oxygen fed into said furnace is at least 100% of the amount needed to completely combust the total amount of fuel fed into said furnace.

2. A method according to claim 1 wherein the fuel comprises coal.

3. A method according to claim 1 wherein said first and second groups of burners are located in a common wall of said furnace and said second group of burners are located higher in said wall than said first group of burners are.

4. A method according to claim 1 wherein said first and second groups of burners are located in a common wall of said furnace and said second group of burners are located further from the edges of said wall than said first group of burners are.

5. A method according to claim 1 wherein a gaseous oxidant stream containing at least 22 vol. % oxygen is added to at least a burner in said first group of burners and at least a burner in said second groups of burners.

6. A method according to claim 1 wherein a gaseous oxidant stream containing at least 22 vol. % oxygen is added to at least a burner in said first group of burners.

7. A method according to claim 1 wherein a gaseous oxidant stream containing at least 22 vol. % oxygen is added to at least a burner in said second groups of burners.

8. A method for combusting hydrocarbonaceous fuel containing bound nitrogen in a furnace comprising providing a furnace which comprises a plurality of burners including first and second groups of burners wherein the burners in said first group are closer to a side wall or to the bottom of said furnace than the burners in said second group, means for supplying combustion air to each of said plurality of burners including a common source for the combustion air fed to said plurality of burners, means for supplying hydrocarbonaceous fuel containing bound nitrogen to each of said plurality of burners and means for supplying overfire air to said furnace, feeding said fuel and combustion air to said burners and combusting said fuel and combustion air in said burners, wherein the stoichiometric ratio of said first group of burners is 1.1 to 1.5 and the stoichiometric ratio of said second group of burners is 0.2 to 0.6, and wherein the total amount of oxygen fed into said furnace is at least 100% of the amount needed to completely combust the total amount of fuel fed into said furnace.

9. A method according to claim 8 wherein the fuel comprises coal.

10. A method according to claim 8 wherein the stoichiometric ratio of said first group of burners is 1.1 to 1.5 and the stoichiometric ratio of said second group of burners is 0.4 to 0.6, and wherein the total amount of oxygen fed into said furnace is at least 100% of the amount needed to completely combust the total amount of fuel fed into said furnace.

11. A method according to claim 8 wherein the burners in said first group are closer to a side wall and to the bottom of said furnace than the burners in said second group.

12. A method according to claim 8 wherein the atmosphere near the furnace walls is oxidizing.

13. A method according to claim 8 wherein said first and second groups of burners are located in a common wall of said furnace and said second group of burners are located higher in said wall than said first group of burners are.

14. A method according to claim 8 wherein said first and second groups of burners are located in a common wall of said furnace and said second group of burners are located further from the edges of said wall than said first group of burners are.

15. A method according to claim 8 wherein a gaseous oxidant stream containing at least 22 vol. % oxygen is added to at least a burner in said first group of burners and at least a burner in said second groups of burners.

16. A method according to claim 8 wherein a gaseous oxidant stream containing at least 22 vol. % oxygen is added to at least a burner in said first group of burners.

17. A method according to claim 8 wherein a gaseous oxidant stream containing at least 22 vol. % oxygen is added to at least a burner in said second groups of burners.

18. A method according to claim 1 wherein in step (C) the stoichiometric ratio of said first group of burners is increased to 1.1 to 1.5 and the stoichiometric ratio of said second group of burners is decreased to 0.2 to 0.6.

19. A method according to claim 1 wherein in step (C) the stoichiometric ratio of said first group of burners is increased to 1.1 to 1.5 and the stoichiometric ratio of said second group of burners is decreased to 0.4 to 0.6.

\* \* \* \* \*